United States Patent
Li et al.

(10) Patent No.: US 12,192,313 B2
(45) Date of Patent: Jan. 7, 2025

(54) METHOD, DEVICE, SYSTEM, AND STORAGE MEDIUM FOR ESTABLISHING LOCAL COMMUNICATION LINK

(71) Applicant: SHENZHEN CHENBEI TECHNOLOGY CO., LTD., Shenzhen (CN)

(72) Inventors: Guolin Li, Shenzhen (CN); Wei Zeng, Shenzhen (CN); Lei Luo, Shenzhen (CN)

(73) Assignee: SHENZHEN CHENBEI TECHNOLOGY CO., LTD., Shenzhen (CN)

( * ) Notice: Subject to any disclaimer, the term of this patent is extended or adjusted under 35 U.S.C. 154(b) by 162 days.

(21) Appl. No.: 17/519,296

(22) Filed: Nov. 4, 2021

(65) Prior Publication Data
US 2022/0159103 A1     May 19, 2022

(30) Foreign Application Priority Data
Nov. 17, 2020  (CN) .......................... 202011297817.1

(51) Int. Cl.
*H04L 69/16*  (2022.01)
*H04L 9/40*  (2022.01)
*H04L 12/28*  (2006.01)

(52) U.S. Cl.
CPC ........ *H04L 69/161* (2013.01); *H04L 12/2818* (2013.01); *H04L 63/0435* (2013.01); *H04L 63/0807* (2013.01); *H04L 2012/285* (2013.01)

(58) Field of Classification Search
CPC ............. H04L 12/2816; H04L 12/2818; H04L 63/0435; H04L 63/0807; H04L 69/161
See application file for complete search history.

(56) References Cited

U.S. PATENT DOCUMENTS

| | | | |
|---|---|---|---|
| 9,774,704 B2* | 9/2017 | He | H04L 12/2818 |
| 2004/0212834 A1* | 10/2004 | Edwards | G06F 3/1253 |
| | | | 358/1.18 |
| 2005/0027985 A1* | 2/2005 | Sprunk | H04L 63/0442 |
| | | | 379/900 |
| 2011/0276703 A1* | 11/2011 | Weizman | H04L 69/161 |
| | | | 709/228 |
| 2014/0059168 A1* | 2/2014 | Ponec | H04L 69/02 |
| | | | 709/217 |

(Continued)

*Primary Examiner* — Jeong S Park
(74) *Attorney, Agent, or Firm* — ANOVA LAW GROUP, PLLC

(57) ABSTRACT

A method for establishing a local communication link includes: generating and sending a local communication negotiation request to a cloud server in response to detecting a first local communication operation between the client and a smart device. The local communication negotiation request is configured to instruct the smart device to allocate a TCP port and feed back a local communication negotiation response carrying a port number of the TCP port to the cloud server, and the local communication negotiation response is forwarded by the cloud server to the client. The method also includes after receiving the local communication negotiation response from the cloud server, sending a first link request carrying the port number to the smart device, and establishing a first TCP link with the smart device, the TCP link being a local communication link.

12 Claims, 4 Drawing Sheets

(56) References Cited

U.S. PATENT DOCUMENTS

| | | | | |
|---|---|---|---|---|
| 2014/0359709 | A1* | 12/2014 | Nassar | H04L 65/403 |
| | | | | 726/4 |
| 2015/0230279 | A1* | 8/2015 | Lee | H04W 76/11 |
| | | | | 370/328 |
| 2016/0165653 | A1* | 6/2016 | Liu | H04W 72/12 |
| | | | | 370/329 |
| 2017/0201509 | A1* | 7/2017 | Alewine | H04L 63/0272 |
| 2017/0324561 | A1* | 11/2017 | Shekh-Yusef | H04L 9/30 |
| 2018/0124188 | A1* | 5/2018 | Olds | H04L 67/02 |
| 2018/0227370 | A1* | 8/2018 | Robles | H04L 67/141 |
| 2019/0097976 | A1* | 3/2019 | Elsins | H04W 76/10 |
| 2020/0053072 | A1* | 2/2020 | Glozman | H04L 9/3215 |
| 2021/0037472 | A1* | 2/2021 | Kim | H04W 52/0222 |
| 2021/0051177 | A1* | 2/2021 | White | H04L 67/56 |
| 2021/0058445 | A1* | 2/2021 | Choi | H04L 67/02 |
| 2022/0174493 | A1* | 6/2022 | Elsins | H04L 12/4641 |

* cited by examiner

METHOD, DEVICE, SYSTEM, AND STORAGE MEDIUM FOR ESTABLISHING LOCAL COMMUNICATION LINK

CROSS-REFERENCE TO RELATED APPLICATION

This application claims priority to Chinese Patent Application No. 202011297817.1, filed on Nov. 17, 2020, the entire content of which is incorporated herein by reference.

TECHNICAL FIELD

The present disclosure generally relates to the technical field of the Internet of Things and, more particularly, to a method, device, system, and storage medium for establishing a local communication link.

BACKGROUND

In mobile hotspot (WIFI) smart home use scenarios, it is usually necessary for a mobile phone application (APP), a cloud server, and a WIFI-enabled home appliance to communicate with each other. A current solution is that interactions between the mobile phone APP and the home appliance need to be transferred through the cloud server.

When a user uses the mobile phone APP to control a home appliance in a same local area network, because the cloud server is generally on a public network, and there are multiple gateways between the mobile phone APP/the home appliance in the local area network and the cloud server, a communication link to the cloud server is caused to be relatively long, and a response is likely to be delayed. Therefore, a current problem of how to respond in a timely manner needs to be resolved.

SUMMARY

One aspect of the present disclosure provides a method for establishing a local communication link, applied to a client, including: generating and sending a local communication negotiation request to a cloud server in response to detecting a first local communication operation between the client and a smart device. The local communication negotiation request is configured to instruct the smart device to allocate a Transmission Control Protocol (TCP) port and feed back a local communication negotiation response carrying a port number of the TCP port to the cloud server, and the local communication negotiation response is forwarded by the cloud server to the client. The method also includes after receiving the local communication negotiation response from the cloud server, sending a first link request carrying the port number to the smart device, and establishing a first TCP link with the smart device, the TCP link being a local communication link.

Another aspect of the present disclosure provides a method for establishing a local communication link, applied to a smart device, including: receiving a local communication negotiation request from a cloud server, the local communication negotiation request being generated and sent to the cloud server by a client after detecting a first local communication operation between the client and the smart device; allocating a TCP port and generating and feeding back a local communication negotiation response carrying a port number of the TCP port, the local communication negotiation response being forwarded by the cloud server to the client; and receiving a first link request carrying the port number from the client, and establishing a first TCP link with the client. The first link request is generated by the client after receiving the local communication negotiation response from the cloud server, and the first TCP link is a local communication link.

Another aspect of the present disclosure provides a client, including: a memory storing a computer program; and a processor configured to execute the computer program to perform: generating and sending a local communication negotiation request to a cloud server in response to detecting a first local communication operation between the client and a smart device. The local communication negotiation request is configured to instruct the smart device to allocate a TCP port and feed back a local communication negotiation response carrying a port number of the TCP port to the cloud server, and the local communication negotiation response is forwarded by the cloud server to the client. The processor is also configured to perform: after receiving the local communication negotiation response from the cloud server, sending a first link request carrying the port number to the smart device, and establishing a first TCP link with the smart device, the TCP link being a local communication link.

Another aspect of the present disclosure provides a smart device, including: a memory storing a computer program; and a processor configured to execute the computer program to perform: receiving a local communication negotiation request from a cloud server, the local communication negotiation request being generated and sent to the cloud server by a client after detecting a first local communication operation between the client and the smart device; allocating a TCP port and generating and feeding back a local communication negotiation response carrying a port number of the TCP port, the local communication negotiation response being forwarded by the cloud server to the client; and receiving a first link request carrying the port number from the client, and establishing a first TCP link with the client. The first link request is generated by the client after receiving the local communication negotiation response from the cloud server, and the first TCP link is a local communication link.

Another aspect of the present disclosure provides a cloud server and a smart device. The client is configured to generate and send a local communication negotiation request to the cloud server in response to a first local communication operation between the client and the smart device. The smart device is configured to allocate a Transmission Control Protocol (TCP) port in response to receiving the local communication negotiation request, and feed back a local communication negotiation response carrying a port number of the TCP port to the cloud server. The cloud server is further configured to forward the local communication negotiation response to the client. The client is further configured to: after receiving the local communication negotiation response from the cloud server, send a first link request carrying the port number to the smart device, and establish a first TCP link with the smart device, the TCP link being a local communication link.

Other aspects of the present disclosure can be understood by those skilled in the art in light of the description, the claims, and the drawings of the present disclosure.

BRIEF DESCRIPTION OF THE DRAWINGS

The following drawings are merely examples for illustrative purposes according to various disclosed embodiments and are not intended to limit the scope of the present disclosure. The drawings in the following description are only some embodiments of the present disclosure. For those of ordinary skill in the art, other drawings can be obtained based on these drawings without inventive efforts.

DETAILED DESCRIPTION OF THE EMBODIMENTS

Technical solutions in the embodiments of the present disclosure are clearly and completely described below with reference to the accompanying drawings in the embodiments of the present disclosure. The described embodiments are part rather than all of the embodiments of the present disclosure. On the basis of the described embodiments, other embodiments obtained by those of ordinary skill in the art without inventive efforts shall fall within the protection scope of the present disclosure.

Figure 1:
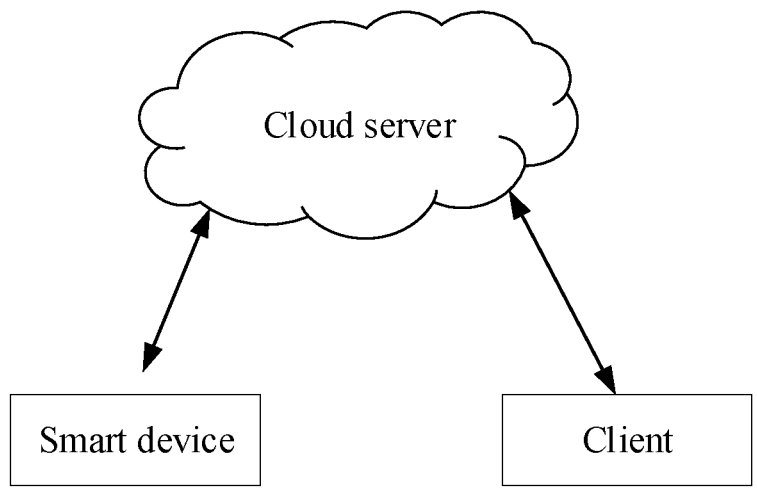
FIG. 1 is a schematic structural diagram of a system for establishing a local communication link according to some embodiments of the present disclosure.

To better understand the technical solutions in the embodiments of the present disclosure, a system for establishing a local communication link is introduced below. FIG. 1 is a schematic structural diagram of a system for establishing a local communication link according to some embodiments of the present disclosure. Referring to FIG. 1, a system for establishing a local communication link includes a client, a server, and a plurality of smart devices.

The client can be an application installed on a smart terminal such as a smart phone, a tablet computer, etc. The smart devices can be smart home devices that can access the Internet of Things via WIFI, such as a smart refrigerator, a smart air conditioner, a smart rice cooker, etc. The above-mentioned client and smart devices can all be connected to a local area network, and a user in the local area network can realize functions such as data acquisition and control of the smart devices through the client.

In the local area network, a client and a smart device do not directly communicate and it usually requires a cloud server outside the local area network to transfer/forward information and facilitate communication interactions between the client and the smart devices. In the embodiments of the present disclosure, to solve a problem of delayed responses caused by using the cloud server to forward information, a fast and effective method for establishing a local communication link is provided. The local communication link can realize direct communication between the client and the smart devices, without needs for the cloud server to forward information. A description is provided in detail below.

Figure 2:
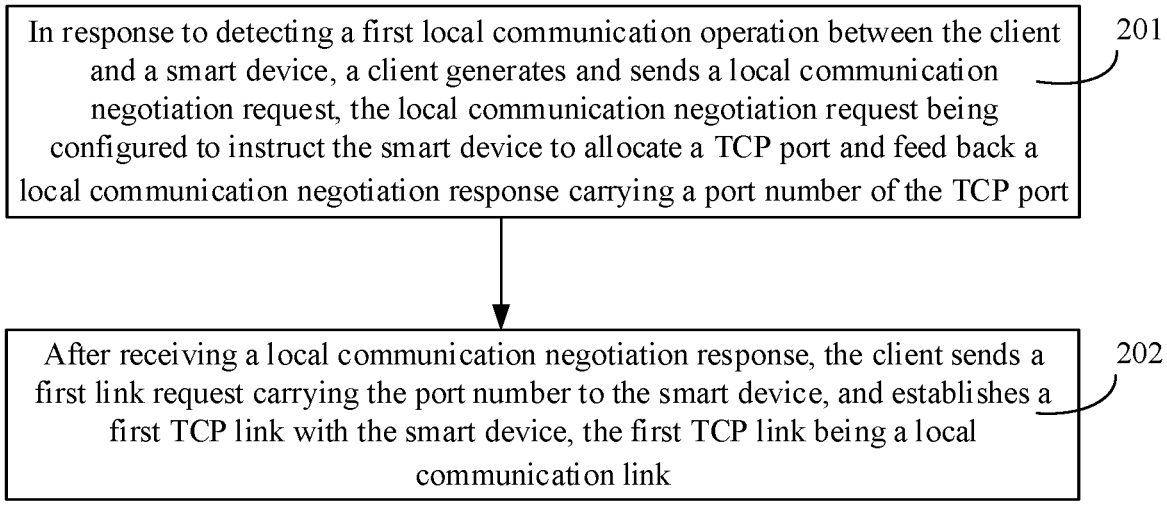
FIG. 2 is a schematic flowchart of a method for establishing a local communication link according to some embodiments of the present disclosure.

FIG. 2 is a schematic flowchart of a method for establishing a local communication link according to some embodiments of the present disclosure. Referring to FIG. 2, the method includes steps 201 and 202.

In 201, in response to detecting a first local communication operation between the client and a smart device, a client generates and sends a local communication negotiation request. The local communication negotiation request is configured to instruct the smart device to allocate a TCP port and feed back a local communication negotiation response carrying a port number of the TCP port. The first local communication operation between the client and a smart device refer to a first operation detected by the client that requires local communication between the client and a smart device.

A user can enable the client to log in to a cloud server by entering an account and a password on the client, and obtain a device list bound to the client's account from the cloud server. Adding a device into the device list bound to the client's account can be realized by the user through manual addition on the client. For example, after the user purchases a new smart refrigerator, the user can input a device identification code (ID) of the smart refrigerator, etc., into a device addition page in the client to realize the binding, and the device ID of the bound smart refrigerator can be transmitted to the cloud server for storage. It should be noted that processes of the client logging in to the cloud server, binding the device ID, etc., are not limited to being implemented in the local area network.

In the embodiments of the present disclosure, when there is at least one smart device in the above-mentioned device list, and if the above-mentioned client is connected to the local area network, the client can start a local discovery process.

The local discovery process is that: the client can send a User Datagram Protocol (UDP) broadcast signal in the local area network every preset time interval. All smart devices in the local area network that support local management can monitor their UDP ports after being turned on, to determine whether the UDP broadcast signal is received. If a smart device determines that the UDP broadcast signal is received, the smart device can feed back a unicast signal to the client. The unicast signal contains a device ID of the smart device and an Internet Protocol (IP) address of the smart device in the local area network, etc.

After the client receives the unicast signal fed back by the smart device in the local area network, the client can use the device ID in the unicast signal to match device IDs in the device list obtained from the cloud server. If the device ID in the unicast signal exists in the device list, it is determined that the smart device corresponding to the device ID is locally online. If the device ID in the unicast signal does not exist in the device list, it is indicated that the device does not belong to the kind of devices that the client can communicate with. It should be noted that if there is still an unmatched device ID in the device list obtained from the cloud server by the client, it is indicated that a smart device corresponding to the unmatched device ID is locally offline. Locally online means that a smart device has fed back a unicast signal and a device ID of the smart device is in the device list, and locally offline means that a device ID of a smart device is in the device list, but a unicast signal of the smart device has not been received. For example, if the device list obtained by the client includes device IDs of devices A and B, after the client sends a UDP broadcast signal, if a unicast signal fed back by the device A is received, it can be determined that the device A is locally online. If a unicast signal fed back by the device B is not received within a preset time period, it can be determined that the device B is locally offline. If a unicast signal fed back by a device C is received, it is determined that the device C does not belong to bound devices.

It is understandable that after determining locally online smart devices, the client can display the locally online smart devices on an interface so that a user can know the smart devices with which interactions can be currently performed through the client.

Furthermore, the embodiments of the present disclosure describe solutions for establishing a local communication link between a locally online smart device and a client. In the description of subsequent embodiments, it is assumed that a smart device is a locally online smart device, which will not be repeated; and smart devices all have device IDs, the device IDs are unique, and different smart devices are distinguished by the device IDs. In the description of the subsequent embodiments, smart devices mentioned all refer to a same smart device, which will not be repeated.

In the embodiments of the present disclosure, there is a trigger condition for establishing a local communication link, which can alternatively be that a user performs a first local communication operation on a client. The first local communication operation indicates that there is an interaction requirement between the client and a smart device. In response to the first local communication operation, the client generates and sends a local communication negotiation request. The local communication negotiation request is used to negotiate with the smart device to establish a local communication link, and the local communication negotiation request is also used to instruct the smart device to allocate a transmission control protocol (TCP) port.

It should be noted that the above-mentioned local communication negotiation request is sent by the client to a cloud server, and then forwarded by the cloud server to the smart device.

After receiving the above-mentioned local communication negotiation request, the smart device can allocate a TCP port. Alternatively, the smart device can determine whether there is an TCP port which is not being occupied for establishing a link among currently available TCP ports. If there is an unoccupied TCP port, this unoccupied TCP port can be allocated first. If there is not an unoccupied TCP port, a TCP port can be activated and allocated. It should be noted that, to avoid problems of wasting resource and cumbersome processes caused by frequently activating or deactivating TCP ports, a TCP port can keep being activated, or keep being activated for a preset time period.

The smart device can also feed back a local communication negotiation response carrying a port number of the TCP port. The local communication negotiation response can be sent to the cloud server first, and be forwarded by the cloud server to the client. That is, in the embodiments of the present disclosure, both the local communication negotiation request and the local communication negotiation response are forwarded by the cloud server between the client and the smart device.

It should be noted that there are two modes of cloud server forwarding. Taking the cloud server forwarding the local communication negotiation request as an example, one is that: the cloud server parses the local communication negotiation request, reconstructs a new local communication negotiation request after identifying a requested service, and forwards the new local communication negotiation request to the smart device. In this mode, for each additional service, the cloud server needs to provide an interface for it. The other is that: the cloud server provides a universal passthrough interface. After receiving the local communication negotiation request, the interface of the cloud server can partially parse the request, but without recognizing service content, and directly repackage the service content before forwarding. In this mode, for different services, the cloud server only provides one passthrough interface, which only cares about data forwarding, and does not parse content of the forwarded data, so that service expansion can be realized between the client and the device without relying on the cloud server.

In 202, after receiving the local communication negotiation response, the client sends a first link request carrying the port number to the smart device, and establishes a first TCP link with the smart device, the first TCP link being a local communication link.

In the embodiments of the present disclosure, after receiving the local communication negotiation response, the client can obtain the port number from the response, send the first link request carrying the port number to the smart device, and establish the first TCP link with the smart device. The first TCP link can be used to implement direct communication between the client and the smart device without the cloud server for forwarding, therefore the first TCP link can be called a local communication link.

It is understandable that the above-mentioned local communication negotiation request contains at least a device ID of the smart device, so that the cloud server can forward the local communication negotiation request to the corresponding smart device according to the device ID after receiving the local communication negotiation request.

In the embodiments of the present disclosure, in response to the first local communication operation between the client and a smart device, the client can generate and send the local communication negotiation request. The local communication negotiation request can be sent to the cloud server, and be forwarded by the cloud server to the smart device. After receiving the local communication negotiation request, the smart device can allocate the TCP port, and the smart device can also feed back the local communication negotiation response carrying the port number of the TCP port. The local communication negotiation response can be sent to the cloud server, and can be fed back by the cloud server to the client. After receiving the local communication negotiation response, the client sends the first link request carrying the port number to the smart device and establishes the first TCP link with the smart device, so that the smart device and the client can perform local communication through the first TCP link. The above-mentioned local communication negotiation request is triggered and generated based on the first local communication operation, so that the first TCP link can be established based on actual needs, with low resource consumption and high security. The above-mentioned TCP port is allocated and the port number of the TCP port is fed back, to establish the link, so that establishment of the local communication link has advantages of high speed and efficiency. Further, the above-mentioned establishment method does not need to use an account and a password, and can further improve security of the establishment of the local communication link.

Figure 3:
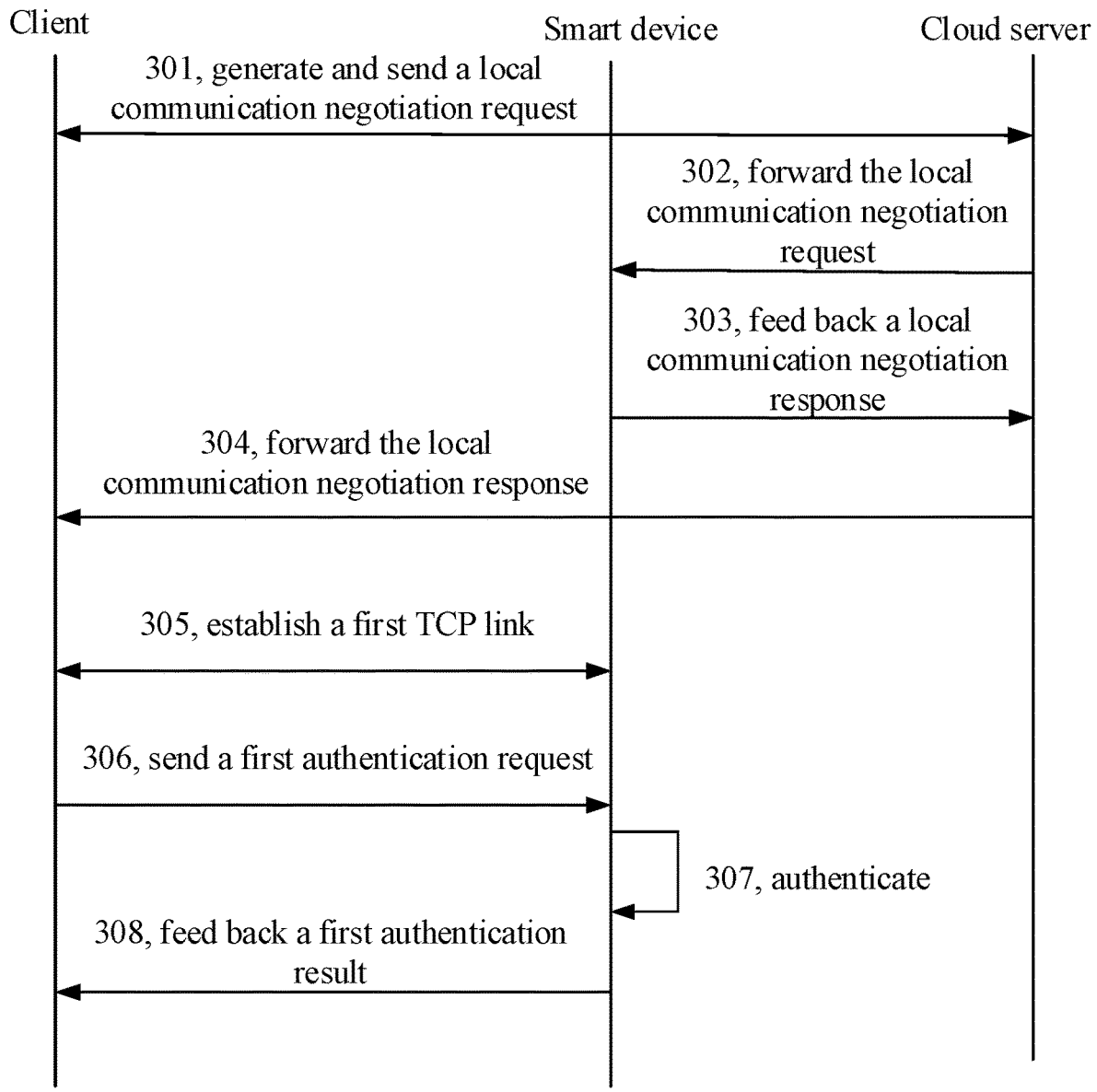
FIG. 3 is an interaction diagram of a method for establishing a local communication link according to some embodiments of the present disclosure.

To better understand the technical solutions in the embodiments of the present disclosure, introduced below is a solution based on interactions of a client, a smart device, and a cloud server, to implement the above-mentioned method for establishing a local communication link. FIG. 3 is an interaction diagram of a method for establishing a local communication link according to some embodiments of the present disclosure. Referring to FIG. 3, the method includes steps 301, 302, 303, 304, 305, 306, 307, and 308.

In 301, the client generates and sends a local communication negotiation request in response to a first local communication operation between the client and the smart device.

In 302, the cloud server receives the local communication negotiation request, and forwards the local communication negotiation request to the smart device.

In 303, the smart device receives the local communication negotiation request, allocates a TCP port, generates a key and an identity token, and feeds back a local communication negotiation response.

Content involved in the above step 301 to step 303 is similar to the content described in step 201 in the embodiments shown in FIG. 2. The related content described in step 201 can be referred to for details, which will not be repeated here.

Further, in the embodiments of the present disclosure, the first local communication operation may be predefined. For example, it may be that a user performs a preset data acquisition operation or control operation with the smart device on an operation interface of the client. For example, on the operation interface of the client, a list of locally online smart devices is displayed. The user can click an icon corresponding to a smart device to enter a control interface of the smart device. An operation of clicking the icon of the smart device can be regarded as a preset control operation, that is, as the above-mentioned first local communication operation to trigger and generate the local communication negotiation request. Or, after entering the control interface, the user can perform a click operation on a data display button in the control interface, and the click operation can be set as a preset data acquisition operation, that is, as the above-mentioned first local communication operation to trigger and generate the local communication negotiation request. Or, after entering the control interface, the user can perform a click operation on a function control button in the control interface, and the click operation can be determined as a preset control operation, that is, as the above-mentioned first local communication operation to trigger and generate the local communication negotiation request.

It can be understood that, in some real circumstances, details of the first local communication operation to trigger and generate the local communication negotiation request depend on actual needs, which are not limited here.

In 304, the cloud server forwards the local communication negotiation response.

In 305, after receiving the local communication negotiation response, the client sends a first link request carrying a port number to the smart device, and establishes a first TCP link with the smart device.

In the embodiments of the present disclosure, after receiving the local communication negotiation response, the client can obtain the port number in the response, and send the first link request carrying the port number to the smart device, so as to establish the first TCP link with the smart device.

In a feasible implementation manner, after the first TCP link is established, the client and the smart device can use the first TCP link for communication interaction.

In another feasible implementation manner, after the first TCP link is established, the smart device can also authenticate the client to improve security of communication using the first TCP link.

Alternatively, when the smart device allocates the TCP port, the smart device can also generate and save the key and the identity token corresponding to the port number of the TCP port, so that after the TCP link is established on the TCP port, the smart device can use the key and the identity token to authenticate an authentication request transmitted through the TCP link, and after the authentication is passed, the smart device can use the key to encrypt data to be sent, and transmit the encrypted data through the TCP link, or use the key to decrypt received data, to improve the security of data transmission between the client and the smart device.

In 306, the client generates a first authentication request according to the key and the identity token, and sends the first authentication request to the smart device through the first TCP link.

In 307, the smart device authenticates the client according to the key and the identity token, and generates a first authentication result.

In 308, the first authentication result is fed back to the client.

In the embodiments of the present disclosure, to improve the security of communication based on the first TCP link, the smart device needs to authenticate an identity of the client, and only when the authentication is passed, the smart device continues to communicate with the client based on the first TCP link.

The aforementioned local communication negotiation response carries the key and the identity token corresponding to the port number, and the client can generate the first authentication request according to the key and the identity token. For example, the client uses the key to encrypt the identity token, to obtain authentication data, and sends the first authentication request containing the authentication data to the smart device through the first TCP link.

After receiving the first authentication request, the smart device can decrypt the authentication data with the locally stored key corresponding to the port number of the TCP port used to establish the first TCP link, obtain the identity token contained in the authentication data, and determine if the identity token corresponding to the above port number matches the identity token contained in the authentication data. If matched, it is determined that the authentication is successful. If not matched, it is determined that the authentication fails. The smart device feeds back the first authentication result that the authentication is passed or not passed to the client through the first TCP link.

It is understandable that after feeding back the first authentication result to the client, if the first authentication result indicates that the authentication of the client is not passed, the smart device can disconnect the first TCP link to ensure security.

In addition, if the authentication is passed, the smart device can use the first TCP link for communication. To avoid the above-mentioned TCP port being occupied for a long time, the smart device can monitor the first TCP link. If detecting that the first TCP link has not been used for communication for longer than a preset time period, the smart device can disconnect the first TCP link, so that other clients can establish a link with the aforementioned TCP port.

Further, if the authentication succeeds, the client can also save the port number, key, and identity token used to establish the first TCP link with the smart device. The port number, the key, and the identity token are saved so that after the first TCP link is disconnected, if the client needs to communicate with the smart device again, the client can use the saved port number, key, and identity token to perform processes of establishing a link and authentication again, without a need to resend a local communication negotiation request to save resources and improve efficiency.

On a basis that the client saves the port number, the key, and the identity token, after the smart device allocates the TCP port, and generates the key and the identity token, the smart device can also generate a valid duration for the key. The valid duration is a retention duration for the key after an authenticated TCP link is disconnected. For example, if the first TCP link is authenticated, the valid duration can be used to limit a maximum duration between a time when a second TCP link is established and a time when the first TCP link is disconnected; and in a case that the valid duration is exceeded, the smart device can delete the key and the identity token, so that after the second TCP link is established, the second TCP link can also be disconnected if an authentication fails, so as to improve the security of communication.

Figure 4:
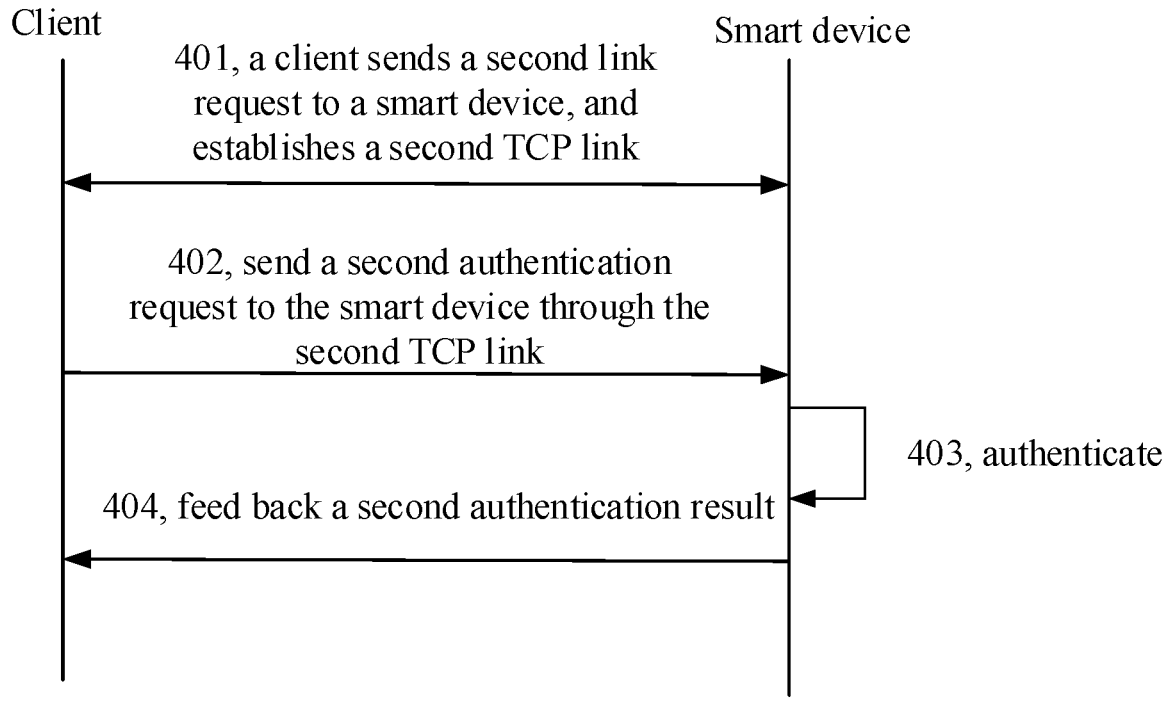
FIG. 4 is another interaction diagram of a method for establishing a local communication link according to some embodiments of the present disclosure.

To better understand the above content, FIG. 4 can be referred to. FIG. 4 is another interaction diagram of a method for establishing a local communication link according to some embodiments of the present disclosure. The method includes steps 401, 402, 403, and 404.

In 401, in response to a second local communication operation, the client sends a second link request carrying the port number to the smart device, and establishes a second TCP link with the smart device.

In 402, the client can generate a second authentication request according to the saved key and identity token, and send the second authentication request to the smart device through the second TCP link.

In 403, the smart device authenticates the client.

In 404, the smart device feeds back a second authentication result.

In the embodiments of the present disclosure, if the first authentication result indicates that the authentication is passed, the smart device can monitor the first TCP link, and when detecting that the first TCP link is disconnected, the smart device can record a disconnection time point of the first TCP link.

When the above-mentioned client is not authenticated within a valid duration starting from the disconnection time point, or the authentication of the client is not passed, to ensure security, the smart device can delete the key and the identity token corresponding to the port number of the TCP port used by the second TCP link. For example, if a valid duration is 10 minutes, a first TCP link is established between a smart device A and a client B using a port number C, a key corresponding to the port number C is D, and an identity token is E, if the smart device A detects that a disconnection time point of the first TCP link is 11:00, and if the smart device A does not receive a second link request carrying the port number C in a time period from 11:00 to 11:10, then it is indicated that a user does not need to perform local communication again within the valid duration, and to ensure the security of communication, the smart device can delete the key D and identity token E corresponding to the port number C.

It is understandable that the client saves the port number of the smart device, the key corresponding to the port number, and the identity token, but the client does not have the valid duration of the key. In this case, if the user performs the preset data acquisition operation or control operation again, which can be regarded as a second local communication operation, the client can send a second link request carrying the port number to the smart device. It should be noted that "first" and "second" in the first local communication operation and the second local communication operation are used to distinguish local communication operations at different moments. The second local communication operation can also be implemented by the user to perform the preset data acquisition operation or control operation with the smart device on the operation interface of the client. The relevant content of the first local communication operation can be referred to for details, which will not be repeated here.

After the client sends the second link request, the client can establish a second TCP link with the smart device.

After establishing the second TCP link, the client generates a second authentication request according to the saved key and identity token, and sends the second authentication request to the smart device through the second TCP link. Alternatively, the client can use the stored key to encrypt the identity token, generate authentication data, and send the authentication data carried in the second authentication request.

After receiving the second authentication request, the smart device can authenticate the client and feed back a second authentication result.

Alternatively, the smart device can determine whether the key and the identity token corresponding to the port number of the TCP port for establishing the second TCP link have been saved. If not, it means that the valid duration of the key has been exceeded and the related key and identity token have been deleted, the authentication fails this time, the second authentication result can be fed back, and the second TCP link can be disconnected. For the client, if the received second authentication result indicates that the authentication is not passed, the client can regenerate a local communication negotiation request. And the process returns to step 301: the client generates and sends a local communication negotiation request in response to a first local communication operation between the client and the smart device.

If it is determined that the key and the identity token corresponding to the above port number are stored, the stored key can be used to decrypt the authentication data in the second authentication request to obtain the decrypted identity token. Determine that if the decrypted identity token is matched with the saved identity token. If yes, it means that the authentication is passed, and the second authentication result is going to be sent to the client, so that the client and the smart device can communicate through the second TCP link. If not, it is determined that the authentication is not passed, the second authentication result can be fed back to the client, and the second TCP link can be disconnected.

Further, to avoid a situation that a client frequently establishes a TCP link with a smart device through a port number illegally accessed, and then disconnects the TCP link because of the failure of an authentication and maintain a valid duration of a key, a condition for the key deletion can also be set as: after a last authenticated TCP link is disconnected, time recording is started; and if a second link request is received and a second TCP link is established before a recorded time duration reaches a valid duration, but a client is not successfully authenticated, then the key and the identity token corresponding to the port number will be deleted. For example, a valid duration is 10 minutes, a first TCP link is established between a smart device A and a client B using a port number C, a key corresponding to the port number C is D, and an identity token is E. The smart device A detects that a disconnection time point of the first TCP link is 11:00. In a time period from 11:00 to 11:10, the smart device A receives a second link request carrying the port number C sent by a client F, and a second TCP link is established between the client F and the smart device A. The client F sends an authentication request, and the smart device A uses the above-mentioned key C and the identity token E to determine that the client F does not pass the authentication, which means that the client F is not the client B that originally established the link with the smart device A. The smart device A can feed back the authentication result that the authentication is not passed to the client F, and disconnect the second TCP link with the client F. When a time reaches 11:10, the smart device A deletes the key D and identity token E corresponding to the port number C.

It should be noted that, in the embodiments of the present disclosure, the first TCP link and the second TCP link are used to distinguish links at different moments, and in general, the first TCP link refers to a link established after a local communication negotiation, and the second TCP link refers to a link established for an N-th time using the saved port number, and N is greater than or equal to 2.

It is understandable that within a valid duration after a first TCP link is disconnected, if a client establishes a TCP link with a smart device but the client fails authentication, time counting of the valid duration is not affected. If within the valid duration, the client establishes a TCP link with the smart device and the client passes the authentication, the smart device can wait until the TCP link is disconnected before performing time counting of a valid duration.

For example, if a valid duration of a key is 10 minutes, and a disconnection time point of a first TCP link is 12:00, in a time period from 12:00 to 12:10, if a client and a smart device have established a second TCP link at 12:05 and the client is successfully authenticated, the smart device can monitor a disconnection time point of the second TCP link. If the disconnection time point of the second TCP link is 12:08, the smart device can record 12:08 as a starting time point for time counting of a valid duration. If a third link request is not received between 12:08 and 12:18, the key and the identity token can be deleted. If the third link request is received between 12:08 and 12:18, the third TCP link is established, and the authentication is passed, a disconnection time point of the third TCP link can be monitored, and so on. By control of whether the client passes the authentication after the link is established based on the valid duration, not only it can be realized that the user can perform multiple operations in a short time period without having to conduct the local communication negotiation between the client and the smart device every time, thereby simplifying processes of link establishment, and saving resources, but also a risk of leaking of the key caused by long-term storage of the key is avoided, thereby improving the security.

It should be noted that, in the embodiments of the present disclosure, a client sending a link request to a smart device may alternatively be that: the client sends a unicast signal, which contains an IP address of the smart device in a local area network and a port number of a TCP port allocated by the smart device, so that the smart device in the local area network can receive the link request and establish a TCP link. The IP address of the smart device in the local area network may be carried when the smart device feeds back a UDP unicast signal after receiving a UDP broadcast signal sent by the client.

In the embodiments of the present disclosure, the establishment of the local communication link is triggered by the first local communication operation between the client and the smart device, so that the local communication link can be established when needed, with low resource consumption. After the local communication link is established, if no data is exchanged within a preset time period, the local communication link is disconnected, so that a problem of wasting resources caused by a TCP port being occupied for a long time without data transmission can be avoided. By saving the port number, key, and identity token fed back by the smart device, the client can establish another link and be successfully authenticated based on its saved port number, the key, and the identity token after the first TCP link is disconnected. In this way, it can avoid a problem of wasting resources caused by repeated local communication negotiations between the client and the same smart device multiple times. Furthermore, the smart device can set the valid duration of the key, to avoid leakage of the key and to effectively control the authentication of the client, thereby further improving the security. When authenticating the client, the key and the identity token are used instead of the client's account and password, which avoids security problems caused by transmission of the account and the password during authentication processes, and simplifies processes to authenticate the client.

Figure 5:
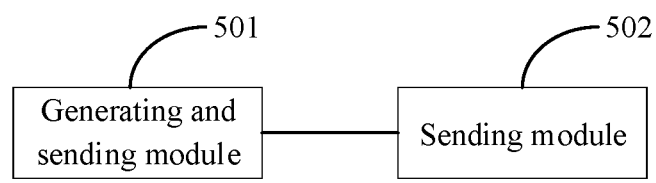
FIG. 5 is a structural block diagram of a client according to some embodiments of the present disclosure.

FIG. 5 is a schematic structural diagram of a client according to some embodiments of the present disclosure. Referring to FIG. 5, a client includes a generating and sending module 501, and a sending module 502.

The generating and sending module 501 is configured to generate and send a local communication negotiation request in response to a first local communication operation between the client and a smart device. The local communication negotiation request is used to instruct the smart device to allocate a TCP port, and feed back a local communication negotiation response carrying a port number of the TCP port. The local communication negotiation request and the local communication negotiation response are forwarded by a cloud server between the client and the smart device.

The sending module 502 is configured to send a first link request carrying the port number to the smart device after receiving the local communication negotiation response, and establish a first TCP link with the smart device. The first TCP link is a local communication link.

In the embodiments of the present disclosure, content of each module involved in the above client is similar to the content of the client involved in the above method embodiments and interaction embodiments. The content described in the previous embodiments can be referred to for details, which will not be described here.

In the embodiments of the present disclosure, the client generates and sends the local communication negotiation request in response to the first local communication operation between the client and the smart device. After receiving the local communication negotiation request, the smart device allocates the TCP port, and feeds back the local communication negotiation response carrying the port number of the TCP port. The local communication negotiation request and the local communication negotiation response are forwarded by the cloud server between the client and the smart device. After receiving the local communication negotiation response, the client can send the smart device the first link request carrying the port number, and establish the first TCP link with the smart device. The first TCP link is a local communication link. The above method can quickly and effectively establish a link between the client and the smart device. The local communication link makes local communication between the client and the smart device possible, and further, the local communication negotiation process is executed under a trigger of the first local communication operation, so that the local communication link is established only when necessary, with low resource consumption and high security.

Figure 6:
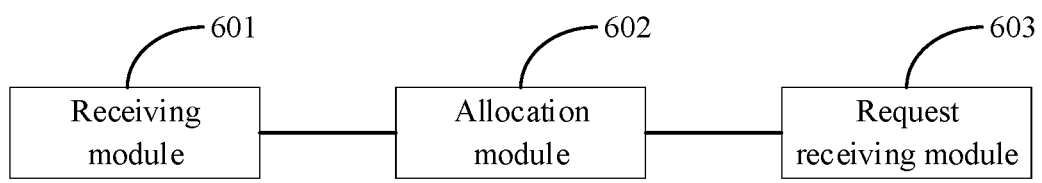
FIG. 6 is a structural block diagram of a smart device according to some embodiments of the present disclosure.

FIG. 6 is a schematic structural diagram of a smart device according to some embodiments of the present disclosure. Referring to FIG. 6, a smart device includes: a receiving module 601, an allocation module 602, and a request receiving module 603.

The receiving module 601 is configured to receive a local communication negotiation request. The local communication negotiation request is generated after a client detects a first local communication operation between the client and the smart device.

The allocation module 602 is configured to allocate a TCP port, and generate and feed back a local communication negotiation response carrying a port number of the TCP port. Both the local communication negotiation request and the local communication negotiation response are forwarded by a cloud server between the client and the smart device.

The request receiving module 603 is configured to receive a first link request carrying the port number, and establish a first TCP link with the client. The first link re-quest is generated by the client after receiving the local communication negotiation response, and the first TCP link is a local communication link.

In the embodiments of the present disclosure, content of each module involved in the above-mentioned smart device is similar to the content of the smart device involved in the above-mentioned method embodiments and interaction embodiments. The content described in the preceding embodiments can be referred to for details, which will not be described here.

In the embodiments of the present disclosure, the client generates and sends the local communication negotiation request in response to the first local communication operation between the client and the smart device. After receiving the local communication negotiation request, the smart device allocates the TCP port and feeds back the local communication negotiation response carrying the port number of the TCP port. The local communication negotiation request and the local communication negotiation response are forwarded by the cloud server between the client and the smart device. After receiving the local communication negotiation response, the client can send the smart device the first link request carrying the port number, and establish the first TCP link with the smart device. The first TCP link is a local communication link. The above method can quickly and effectively establish a link between the client and the smart device. The local communication link makes local communication between the client and the smart device possible, and further, the local communication negotiation process is executed under a trigger of the first local communication operation, so that the local communication link is established only when necessary, with low resource consumption and high security.

In one embodiment, a client is provided, including a memory and a processor. The memory stores a computer program, and when the computer program is executed by the processor, the processor is enabled to execute relevant steps performed by the client in the foregoing embodiments.

In one embodiment, a smart device is provided, including a memory and a processor. The memory stores a computer program, and when the computer program is executed by the processor, the processor is enabled to execute relevant steps performed by the smart device in the above embodiments.

In one embodiment, a computer-readable storage medium is provided that stores a computer program. When the computer program is executed by a processor, the processor is enabled to execute relevant steps performed by the client in the above-mentioned embodiments.

In one embodiment, a computer-readable storage medium is provided that stores a computer program. When the computer program is executed by a processor, the processor is enabled to execute relevant steps performed by the smart device in the above-mentioned embodiments.

In one embodiment, a computer device is provided, including a memory and a processor. A computer program is stored in the memory. When the processor calls the computer program in the memory, relevant steps performed by the client in the foregoing embodiments are implemented.

In one embodiment, a computer device is provided, including a memory and a processor. A computer program is stored in the memory. When the processor calls the computer program in the memory, relevant steps performed by the smart device in the above-mentioned embodiments are implemented.

Figure 7:
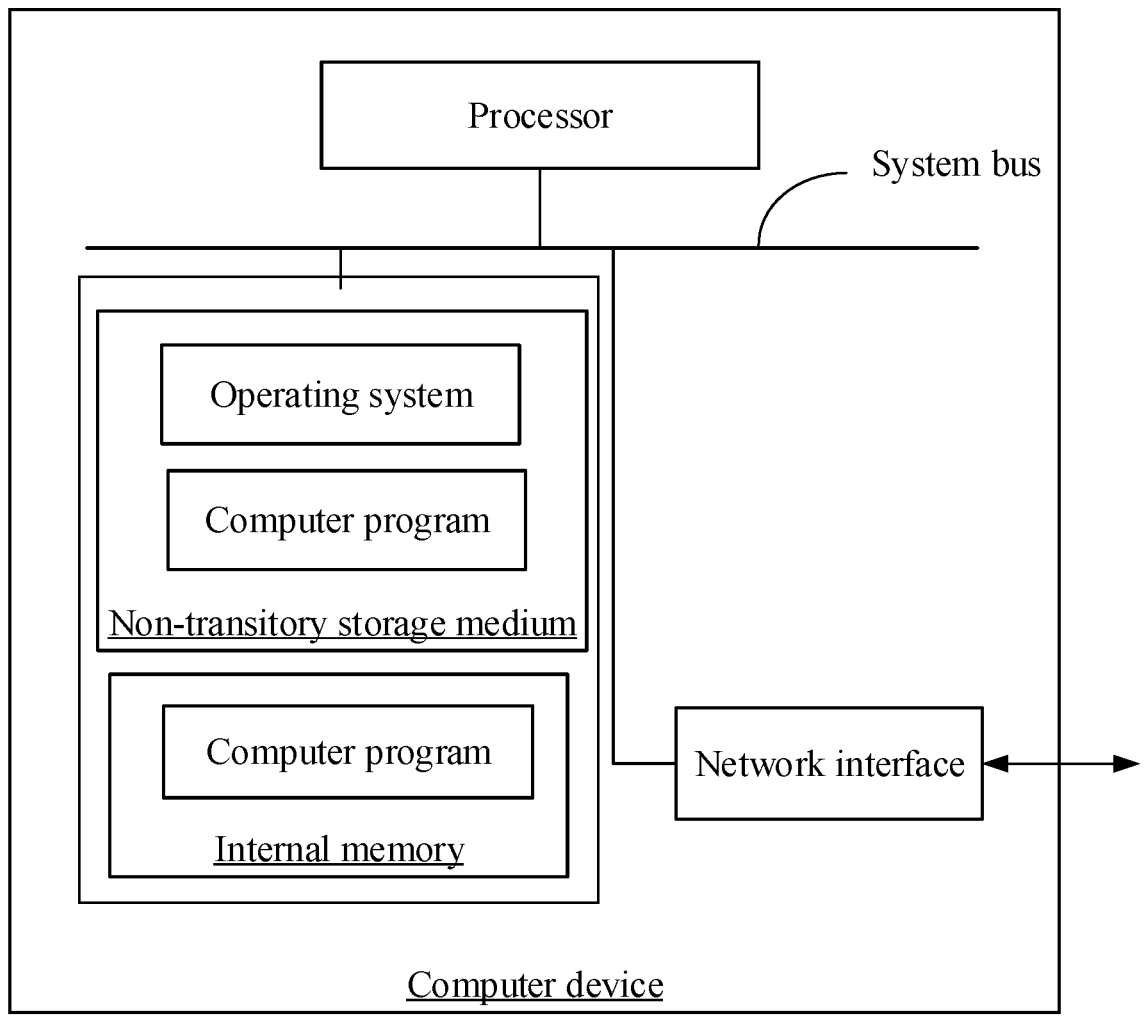
FIG. 7 is an internal structure diagram of a computer device according to some embodiments of the present disclosure.

FIG. 7 is an internal structure diagram of a computer device according to some embodiments of the present disclosure. Referring to FIG. 7, a computer device may be a terminal, such as the client involved in the above-mentioned embodiments, or may be a smart device, such as the smart device involved in the above embodiments. As shown in FIG. 7, the computer device includes a processor, a memory, and a network interface connected through a system bus. The memory includes a non-transitory storage medium and an internal memory. The non-transitory storage medium of the computer device stores an operating system and may also store a computer program. When the computer program is executed by the processor, the processor can implement a method for establishing a local communication link. A computer program may also be stored in the internal memory, and when the computer program is executed by the processor, the processor can execute a method for establishing a local communication link. Those skilled in the art can understand that the structures shown in FIG. 7 is only a block diagram of part of the structures related to the solutions of the present disclosure, and does not constitute a limitation on the computer device to which the solutions of the present disclosure are applied. A specific computer device may include more or fewer parts than shown in FIG. 7, or combine some parts, or have a different arrangement of parts.

A person of ordinary skill in the art can understand that all or part of processes in the above-mentioned embodiment methods can be implemented by instructing relevant hardware through a computer program. The program can be stored in a non-transitory computer readable storage medium. When the program is executed, the processes of the above-mentioned method embodiments may be included. Any reference to a memory, a storage, a database or other media used in the embodiments provided in the present disclosure may include a non-transitory and/or transitory memory. The non-transitory memory may include a read only memory (ROM), a programmable ROM (PROM), an electrically programmable ROM (EPROM), an electrically erasable programmable ROM (EEPROM), or a flash memory. The transitory memory may include a random access memory (RAM) or an external cache memory. As an illustration and not a limitation, the RAM is available in many forms, such as a static RAM (SRAM), a dynamic RAM (DRAM), a synchronous DRAM (SDRAM), a double data rate SDRAM (DDRSDRAM), an enhanced SDRAM (ESDRAM), a synchronous chain Channel (Synchlink) DRAM (SLDRAM), a memory bus (Rambus) direct RAM (RDRAM), a direct memory bus dynamic RAM (DRDRAM), and a memory bus dynamic RAM (RDRAM), etc.

The technical features of the above embodiments can be combined arbitrarily. To make the description concise, all possible combinations of the technical features in the above embodiments are not described. However, as long as there is no conflict in the combinations of these technical features, they should be considered as the scope described in the present disclosure.

The above-mentioned embodiments only describe several implementation manners of the present disclosure, and the descriptions are relatively specific and detailed, but they cannot be understood as a limitation to the scope of the present disclosure. It should be pointed out that for those of ordinary skill in the art, without departing from the concept of the present disclosure, several modifications and improvements can be made, and these all fall within the protection scope of the present disclosure. Therefore, the protection scope of the present disclosure shall be subject to the appended claims.

What is claimed is:

1. A method for establishing a local communication link, applied to a client, the method comprising:
generating and sending a local communication negotiation request to a cloud server in response to a first local communication operation between the client and a smart device, wherein the local communication negotiation request is forwarded by the cloud server to the smart device and configured to instruct the smart device to allocate a Transmission Control Protocol (TCP) port and feed back a local communication negotiation response carrying a port number of the TCP port to the cloud server, and the local communication negotiation response is forwarded by the cloud server to the client, and wherein the local communication negotiation response further carries an identity token corresponding to the port number;
after receiving the local communication negotiation response from the cloud server, sending a first link request carrying the port number to the smart device without the cloud server for forwarding, and establishing a first TCP link with the smart device, wherein the first TCP link is a local communication link;
generating a first authentication request according to the identity token, and sending the first authentication request to the smart device through the first TCP link, wherein the first authentication request is used by the smart device to authenticate the client and feed back a first authentication result through the first TCP link;
in response to an indication by the first authentication result that the client is authenticated, saving the port number and the identity token of the smart device;
after the first TCP link is disconnected, in response to a second local communication operation with the smart device, sending a second link request carrying the port number to the smart device, and establishing a second TCP link with the smart device; and
in response to an indication from the smart device that an authentication of the client has failed, deleting the port number and the identity token, and generating and sending another local communication negotiation request to the smart device through the cloud server.

2. The method according to claim 1, wherein the method further comprises:
in response to a detection that a user performs a preset data acquisition operation or a control operation for controlling the smart device on an operation interface of the client, determining that the first local communication operation is detected.

3. The method according to claim 1, further comprising:
detecting an operation of clicking an icon of the smart device on an operation interface of the client, wherein the operation of clicking the icon of the smart device is regarded as the first local communication operation.

4. The method according to claim 1, further comprising:
after the first TCP link is disconnected, sending a second link request carrying the port number to the smart device; and
receiving a rejection when a time duration between a time when the first TCP link is disconnected and a time when the second link request is sent is greater than a preset time duration.

5. A method for establishing a local communication link, applied to a smart device, comprising:
receiving a local communication negotiation request from a cloud server, wherein the local communication negotiation request is generated and sent to the cloud server by a client after detecting a first local communication operation between the client and the smart device;
allocating a TCP port and generating and feeding back a local communication negotiation response carrying a port number of the TCP port to the cloud server, wherein the local communication negotiation response is forwarded by the cloud server to the client, and wherein the local communication negotiation response further carries an identity token corresponding to the port number;
receiving a first link request carrying the port number from the client without the cloud server for forwarding, and establishing a first TCP link with the client, wherein the first link request is generated by the client after receiving the local communication negotiation response from the cloud server, and the first TCP link is a local communication link;
receiving a first authentication request sent by the client through the first TCP link;
in response to the first authentication request, authenticating the client according to the identity token, and feeding back a first authentication result to the client;
after the first TCP link is disconnected, in response to a second local communication operation with the smart device, receiving a second link request carrying the port number for a second TCP link to be established; and
in response to an indication from the smart device that an authentication of the client has failed, receiving another local communication negotiation request from the client through the cloud server, after the port number and the identity token is deleted by the client.

6. The method according to claim 5, wherein the method further comprises:
saving the identity token corresponding to the port number.

7. The method according to claim 5, wherein the method further comprises:
generating a valid duration of a key, wherein the valid duration is a retention duration of the key after an authenticated TCP link is disconnected.

8. A client, comprising: a memory storing a computer program; and
a processor configured to execute the computer program to perform:
in response to a first local communication operation between the client and a smart device, generating and sending a local communication negotiation request to a cloud server, wherein the local communication negotiation request is forwarded by the cloud server to the smart device and configured to instruct the smart device to allocate a Transmission Control Protocol (TCP) port and feed back a local communication negotiation response carrying a port number of the TCP port to the cloud server, and the local communication negotiation response is forwarded by the cloud server to the client, and wherein the local communication negotiation response further carries an identity token corresponding to the port number;

after receiving the local communication negotiation response from the cloud server, sending a first link request carrying the port number to the smart device without the cloud server for forwarding, and establishing a first TCP link with the smart device, wherein the first TCP link is a local communication link;

generating a first authentication request according to the identity token, and sending the first authentication request to the smart device through the first TCP link, wherein the first authentication request is used by the smart device to authenticate the client and feed back a first authentication result through the first TCP link;

in response to an indication by the first authentication result that the client is authenticated, saving the port number and the identity token of the smart device;

after the first TCP link is disconnected, in response to a second local communication operation with the smart device, sending a second link request carrying the port number to the smart device, and establishing a second TCP link with the smart device; and in response to an indication from the smart device that an authentication of the client has failed, deleting the port number and the identity token, and generating and sending another local communication negotiation request to the smart device through the cloud server.

9. The client according to claim 8, wherein the processor is further configured to perform:
in response to a detection that a user performs a preset data acquisition operation or a control operation for controlling the smart device on an operation interface of the client, determining that the first local communication operation is detected.

10. A smart device, comprising: a memory storing a computer program; and a processor configured to execute the computer program to perform:
receiving a local communication negotiation request from a cloud server, wherein the local communication negotiation request is generated by a client after detecting a first local communication operation between the client and the smart device;
allocating a TCP port and generating and feeding back a local communication negotiation response carrying a port number of the TCP port to the cloud server, wherein the local communication negotiation response is forwarded by the cloud server to the client, and wherein the local communication negotiation response further carries an identity token corresponding to the port number; and
receiving a first link request carrying the port number from the client without the cloud server for forwarding, and establishing a first TCP link with the client, wherein the first link request is generated by the client after receiving the local communication negotiation response from the cloud server, and the first TCP link is a local communication link;
receiving a first authentication request sent by the client through the first TCP link;
in response to the first authentication request, authenticating the client according to the identity token, and feeding back a first authentication result to the client;

after the first TCP link is disconnected, in response to a second local communication operation with the smart device, receiving a second link request carrying the port number for a second TCP link to be established; and in response to an indication from the smart device that an authentication of the client has failed, receiving another local communication negotiation request from the client through the cloud server, after the port number and the identity token is deleted by the client.

11. The smart device according to claim 10, wherein the processor is further configured to perform:
generating a valid duration of a key, wherein the valid duration is a retention duration of the key after an authenticated TCP link is disconnected.

12. A system for establishing a local communication link, comprising:
a cloud server, a client, and a smart device, wherein:
the client includes a first memory and a first processor coupled to the first memory, the first processor being configured to generate and send a local communication negotiation request to the cloud server in response to a first local communication operation between the client and the smart device;
the cloud server includes a second memory and a second processor coupled to the second memory, the second processor being configured to forward the local communication negotiation request to the smart device;
the smart device includes a third memory and a third processor coupled to the third memory, the third processor being configured to allocate a Transmission Control Protocol (TCP) port in response to receiving the local communication negotiation request, and feed back a local communication negotiation response carrying a port number of the TCP port to the cloud server;
the second processor is further configured to forward the local communication negotiation response to the client, and wherein the local communication negotiation response further carries an identity token corresponding to the port number;
the first processor is further configured to: after receiving the local communication negotiation response from the cloud server, send a first link request carrying the port number to the smart device without the cloud server for forwarding, and establish a first TCP link with the smart device, wherein the TCP link is a local communication link; and
the first processor is further configured to:
generate a first authentication request according to the identity token, and send the first authentication request to the smart device through the first TCP link, wherein the first authentication request is used by the smart device to authenticate the client and feed back a first authentication result through the first TCP link;
in response to an indication by the first authentication result that the client is authenticated, save the port number and the identity token of the smart device;
after the first TCP link is disconnected, in response to a second local communication operation with the smart device, send a second link request carrying the port number to the smart device, and establish a second TCP link with the smart device; and
in response to an indication from the smart device that an authentication of the client has failed, delete the port number and the identity token, and generate and send another local communication negotiation request to the smart device through the cloud server.

\* \* \* \* \*